US010488221B2

(12) United States Patent
Verheijen et al.

(10) Patent No.: US 10,488,221 B2
(45) Date of Patent: Nov. 26, 2019

(54) APPARATUS AND METHOD FOR VEHICLE ECONOMY IMPROVEMENT

(71) Applicant: TomTom Telematics B.V., Amsterdam (NL)

(72) Inventors: Paul Roeland Verheijen, Heemstede (NL); Jasper Johannes Anthonius Pauwelussen, The Hague (NL); Christoph Ebert, Leipzig (DE); Steffen Orlowsky, Dessau-Roßlau (DE); Marco Leupold, Leipzig (DE); Stefan Kreim, Leipzig (DE); Alexander Schmidt, Halle (DE)

(73) Assignee: TOMTOM TELEMATICS B.V., Amsterdam (NL)

( * ) Notice: Subject to any disclaimer, the term of this patent is extended or adjusted under 35 U.S.C. 154(b) by 144 days.

(21) Appl. No.: 15/523,406

(22) PCT Filed: Nov. 26, 2015

(86) PCT No.: PCT/EP2015/077838
§ 371 (c)(1),
(2) Date: May 1, 2017

(87) PCT Pub. No.: WO2016/083543
PCT Pub. Date: Jun. 2, 2016

(65) Prior Publication Data

US 2017/0305435 A1 Oct. 26, 2017

(30) Foreign Application Priority Data

Nov. 26, 2014 (GB) .................................. 1420988.6
Mar. 12, 2015 (GB) .................................. 1504234.4

(51) Int. Cl.
*G01C 21/36* (2006.01)
*G07C 5/00* (2006.01)
(Continued)

(52) U.S. Cl.
CPC .......... *G01C 21/3697* (2013.01); *B60K 31/00* (2013.01); *B60R 16/0236* (2013.01);
(Continued)

(58) Field of Classification Search
CPC ................ G01C 21/3697; B60K 31/00; B60R 16/0236; B60W 30/18072; B60W 30/18136; B60W 40/09; B60W 50/14
See application file for complete search history.

(56) References Cited

U.S. PATENT DOCUMENTS 4,770,066 A 9/1988 Hayasaki et al.
5,794,170 A 8/1998 Kuroda et al.
(Continued)

FOREIGN PATENT DOCUMENTS

CN 103818384 A 5/2014
CN 104066637 A 9/2014
(Continued)

OTHER PUBLICATIONS

International Search Report dated Mar. 2, 2016 for application No. PCT/EP2015/077838.
(Continued)

*Primary Examiner* — Anne M Antonucci
*Assistant Examiner* — Renee LaRose

(57) ABSTRACT

A method and apparatus for evaluating the driving of a vehicle performing a journey on a road network is disclosed. The method comprises determining a fuel usage rate and an engine speed of a vehicle, and determining when the vehicle is coasting based upon at least one of the fuel usage rate and the engine speed of the vehicle. An acceleration of the vehicle, when the vehicle is determined to be coasting, is compared with a predetermined reference acceleration, and an application of braking during the coasting is determined based on the result of the comparison. A method and
(Continued)

apparatus is also disclosed for determining a score indicative of the relative amount of time for which the vehicle is coasting without braking during a journey.

20 Claims, 7 Drawing Sheets

(51) Int. Cl.

| | |
|---|---|
| ***G07C 5/08*** | (2006.01) |
| ***B60R 16/023*** | (2006.01) |
| ***B60W 40/09*** | (2012.01) |
| ***B60K 31/00*** | (2006.01) |
| ***F16H 59/44*** | (2006.01) |
| ***F16H 59/46*** | (2006.01) |
| ***F16H 61/02*** | (2006.01) |
| ***B60W 50/14*** | (2012.01) |
| ***B60W 30/18*** | (2012.01) |
| ***G08G 1/01*** | (2006.01) |
| ***G07C 5/02*** | (2006.01) |
| ***G07C 5/06*** | (2006.01) |
| ***G08G 1/0962*** | (2006.01) |
| ***G08G 1/0967*** | (2006.01) |
| ***G08G 1/0968*** | (2006.01) |
| ***G08G 1/052*** | (2006.01) |
| ***G01P 1/00*** | (2006.01) |
| ***F16H 63/42*** | (2006.01) |
| *B60W 50/00* | (2006.01) |
| *F16H 59/70* | (2006.01) |
| *F16H 59/36* | (2006.01) |

(52) U.S. Cl.

CPC ...... *B60W 30/18* (2013.01); *B60W 30/18072* (2013.01); *B60W 30/18109* (2013.01); *B60W 30/18136* (2013.01); *B60W 40/09* (2013.01); *B60W 50/14* (2013.01); *F16H 59/44* (2013.01); *F16H 59/46* (2013.01); *F16H 61/0213* (2013.01); *F16H 61/0246* (2013.01); *F16H 63/42* (2013.01); *G01P 1/06* (2013.01); *G07C 5/004* (2013.01); *G07C 5/008* (2013.01); *G07C 5/02* (2013.01); *G07C 5/06* (2013.01); *G07C 5/085* (2013.01); *G07C 5/0816* (2013.01); *G07C 5/0825* (2013.01); *G07C 5/0841* (2013.01); *G08G 1/0112* (2013.01); *G08G 1/0129* (2013.01); *G08G 1/0137* (2013.01); *G08G 1/0141* (2013.01); *G08G 1/052* (2013.01); *G08G 1/0967* (2013.01); *G08G 1/09626* (2013.01); *G08G 1/09685* (2013.01); *G08G 1/096716* (2013.01); *G08G 1/096741* (2013.01); *G08G 1/096775* (2013.01); *G08G 1/096827* (2013.01); *G08G 1/096861* (2013.01); *B60K 2370/172* (2019.05); *B60K 2370/174* (2019.05); *B60W 2030/1809* (2013.01); *B60W 2030/18081* (2013.01); *B60W 2050/0078* (2013.01); *B60W 2510/0623* (2013.01); *B60W 2510/0638* (2013.01); *B60W 2510/0642* (2013.01); *B60W 2510/0647* (2013.01); *B60W 2510/1005* (2013.01); *B60W 2520/10* (2013.01); *B60W 2520/105* (2013.01); *B60W 2530/14* (2013.01); *B60W 2550/14* (2013.01); *B60W 2550/141* (2013.01); *B60W 2550/20* (2013.01); *B60W 2550/402* (2013.01); *B60W 2560/06* (2013.01); *B60W 2710/0655* (2013.01); *B60Y 2300/52* (2013.01); *F16H 59/70* (2013.01); *F16H 2059/366* (2013.01); *F16H 2061/0218* (2013.01); *F16H 2063/426* (2013.01); *G01C 21/3632* (2013.01); *G01C 21/3673* (2013.01); *Y02T 10/76* (2013.01); *Y02T 10/84* (2013.01)

(56) References Cited

U.S. PATENT DOCUMENTS

2007/0256481 A1 11/2007 Nishiyama et al.
2011/0015037 A1 1/2011 Koenig

FOREIGN PATENT DOCUMENTS

JP 2004210123 A 7/2004
JP 2012030710 A 2/2012

OTHER PUBLICATIONS

Search Report dated Sep. 21, 2015 for GB Application No. 1504234.4.

A : current vehicle state data (OBD data and data derived therefrom)

B : over-revving events, fuel consumption data, etc

C : green speed

D : aggregated events for determining performance indictors

E : report data with determined performance indicators

A : Is the vehicle speed > $T_{S1}$?

B : Is the vehicle fuel rate < $T_{F1}$?

C : Is the vehicle fuel rate > 0 and < $T_{F2}$ AND is the engine speed > 0 and < $T_{E1}$?

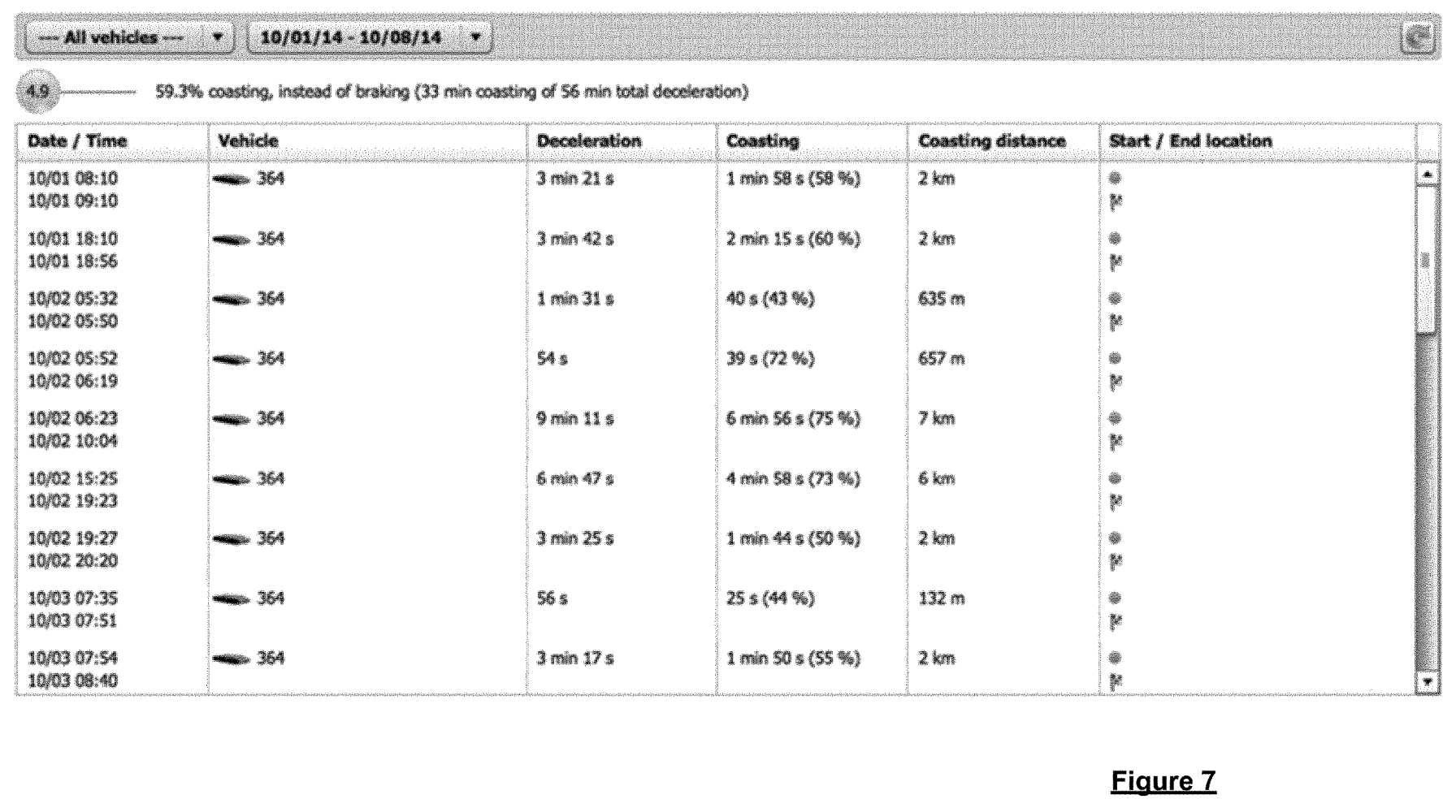

--- All vehicles --- | 10/01/14 - 10/08/14

4.9 — 59.3% coasting, instead of braking (33 min coasting of 56 min total deceleration)

| Date / Time | Vehicle | Deceleration | Coasting | Coasting distance | Start / End location |
| --- | --- | --- | --- | --- | --- |
| 10/01 08:10<br>10/01 09:10 | 364 | 3 min 21 s | 1 min 58 s (58 %) | 2 km | |
| 10/01 18:10<br>10/01 18:56 | 364 | 3 min 42 s | 2 min 15 s (60 %) | 2 km | |
| 10/02 05:32<br>10/02 05:50 | 364 | 1 min 31 s | 40 s (43 %) | 635 m | |
| 10/02 05:52<br>10/02 06:19 | 364 | 54 s | 39 s (72 %) | 657 m | |
| 10/02 06:23<br>10/02 10:04 | 364 | 9 min 11 s | 6 min 56 s (75 %) | 7 km | |
| 10/02 15:25<br>10/02 19:23 | 364 | 6 min 47 s | 4 min 58 s (73 %) | 6 km | |
| 10/02 19:27<br>10/02 20:20 | 364 | 3 min 25 s | 1 min 44 s (50 %) | 2 km | |
| 10/03 07:35<br>10/03 07:51 | 364 | 56 s | 25 s (44 %) | 132 m | |
| 10/03 07:54<br>10/03 08:40 | 364 | 3 min 17 s | 1 min 50 s (55 %) | 2 km | |

Figure 7

APPARATUS AND METHOD FOR VEHICLE ECONOMY IMPROVEMENT

CROSS-REFERENCE TO RELATED APPLICATIONS

The present application is a National Stage of International Application No. PCT/EP2015/077838, filed on Nov. 26, 2015, and designating the United States, which claims benefit to United Kingdom Patent Application 1420988.6 filed on Nov. 26, 2014, and United Kingdom Patent Application 1504234.4 filed on Mar. 12, 2015. The entire content of these applications is incorporated herein by reference.

FIELD OF THE INVENTION

The present invention relates to a method and apparatus for evaluating vehicle driving, for example, for provision to a driver of the vehicle and/or to a manager of a fleet of vehicles. For example, the invention can in embodiments relate to the determination of whether a driver is coasting with braking or coasting without braking, and the provision of information to the driver or fleet manager indicative of the amount of time spent coasting without braking during a journey relative to total amount of time that could have been coasted.

BACKGROUND OF THE INVENTION

Increasingly it is desired to improve a fuel economy of vehicles, particularly, although not exclusively, vehicles powered by fossil fuels, such as petrol and diesel. Although it will be realised that improving the fuel economy of any vehicle, including electric, hybrid and hydrogen powered vehicles, for example, is also desired. Some efforts at improving the fuel economy of vehicles are focussed on increasing an efficiency of the vehicle, such as a mechanical and/or electrical efficiency of the vehicle. It has also been realised that the manner in which a vehicle is driven can have a significant impact of the vehicle's economy.

It is known that coasting, in this instance meaning that a driver has lifted their foot off the accelerator (or gas pedal) to reduce vehicle speed, such that the vehicle is allowed to naturally decelerate or to roll without being under power, can have a positive effect on vehicle economy.

It is therefore desirable to provide a method by which the degree of coasting during a journey can be evaluated, such that the driver, or any other interested party, can use this information in order to improve their driving in subsequent journeys.

SUMMARY OF THE INVENTION

In accordance with a first aspect of the present invention there is provided a method of evaluating the driving of a vehicle performing a journey on a road network, comprising:

determining a fuel usage rate and an engine speed of a vehicle;

determining when the vehicle is coasting based upon at least one of the fuel usage rate and the engine speed of the vehicle;

comparing an acceleration of the vehicle, when the vehicle is determined to be coasting, with a predetermined reference acceleration; and determining an application of braking during the coasting based on the result of the comparison.

The present invention extends to an apparatus for carrying out a method in accordance with any of the aspects or embodiments of the invention herein described.

Thus, in accordance with another aspect of the invention there is provided an apparatus for evaluating the driving of a vehicle performing a journey on a road network, comprising:

means for determining a fuel usage rate and an engine speed of a vehicle;

means for determining when the vehicle is coasting based upon at least one of the fuel usage rate and the engine speed of the vehicle;

means for comparing an acceleration of the vehicle, when the vehicle is determined to be coasting, with a predetermined reference acceleration; and means for determining an application of braking during the coasting based on the result of the comparison.

Similarly, in accordance with another aspect of the invention there is provided an apparatus for evaluating the driving of a vehicle performing a journey on a road network, comprising at least one processor and a memory containing instructions that, when executed by the at least one processor, cause the apparatus to:

determine a fuel usage rate and an engine speed of a vehicle;

determine when the vehicle is coasting based upon at least one of the fuel usage rate and the engine speed of the vehicle;

compare an acceleration of the vehicle, when the vehicle is determined to be coasting, with a predetermined reference acceleration; and determine an application of braking during the coasting based on the result of the comparison.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

In embodiments, the determining of the application of braking during the coasting comprises determining that the vehicle is coasting with braking when the acceleration of the vehicle is less than the predetermined reference acceleration. The determining of the application of braking during the coasting may additionally or alternatively comprise determining that the vehicle is coasting without braking when the acceleration of the vehicle is greater than or equal to the reference acceleration.

In embodiments, the a coasting state of the vehicle may be determined based upon at least one of the fuel usage rate and the engine speed of the vehicle, and the predetermined reference acceleration selected based on the determined coasting state. The coasting state may be one of: coasting in gear; and coasting in neutral. The coasting state may be determined based upon a comparison between the fuel usage rate and at least one predetermined threshold. The coasting state may be determined to be coasting in gear when the fuel usage rate is less than an idle fuel usage rate. The coasting state may be determined to be coasting in neutral when the fuel usage rate is less than a predetermined threshold based upon an idle fuel usage rate. The coasting state may be determined to be coasting in neutral based upon the fuel usage rate and when the engine speed is less than a predetermined threshold based upon an idle engine speed.

In embodiments, the predetermined reference acceleration may be determined based upon an air resistance component and an engine resistance component. The air resistance component may be based upon one or more of: vehicle speed; air density; air drag coefficient; vehicle frontal area; and vehicle mass. The engine resistance component may be based upon the engine speed.

In embodiments, a first time may be determined indicative of the duration of time for which the vehicle is coasting with braking during the journey. A representation of the first time may be displayed on a display device, optionally within the vehicle, and/or the first time may be transmitted to a remote device.

In embodiments, a second time may be determined indicative of the duration of time for which the vehicle is coasting without braking during the journey. A representation of the second time may be displayed on a display device, optionally within the vehicle, and/or the second time may be transmitted to a remote device.

In embodiments, a score may be determined indicative of the relative amount of time for which the vehicle is coasting without braking during the journey based on the first and second times. A representation of the score may be displayed on a display device, optionally within the vehicle, and/or the score may be transmitted to a remote device.

In embodiments, an apparatus according to the invention may comprise a communication unit for wirelessly transmitting data indicative of the application of braking in the coasting state to a remote computing device. An apparatus according to the invention may form part of a system, further including a remote computing device arranged to receive the data indicative of the application of braking in the coasting state from the apparatus.

Methods in accordance with the present invention may be implemented at least partially using software, e.g. computer programs. The present invention thus also extends to a computer program comprising computer readable instructions executable to perform a method according to any of the embodiments of the invention.

The invention thus also extends to a computer software carrier comprising software which when used to operate a system or apparatus comprising data processing means causes, in conjunction with said data processing means, said apparatus or system to carry out the steps of a method in accordance with embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which:

FIG. 7 is an illustration of an exemplary report as viewable on the computer of the fleet manager showing the coasting performance indicator (or metric) for a plurality of trips made by a vehicle or driver.

DETAILED DESCRIPTION OF THE PREFERRED EMBODIMENTS

Embodiments of the invention are directed to methods and systems for monitoring the performance of drivers of vehicles over one or more journeys, and methods and systems for providing feedback to a driver in order to promote more economical driving.

Figure 1:
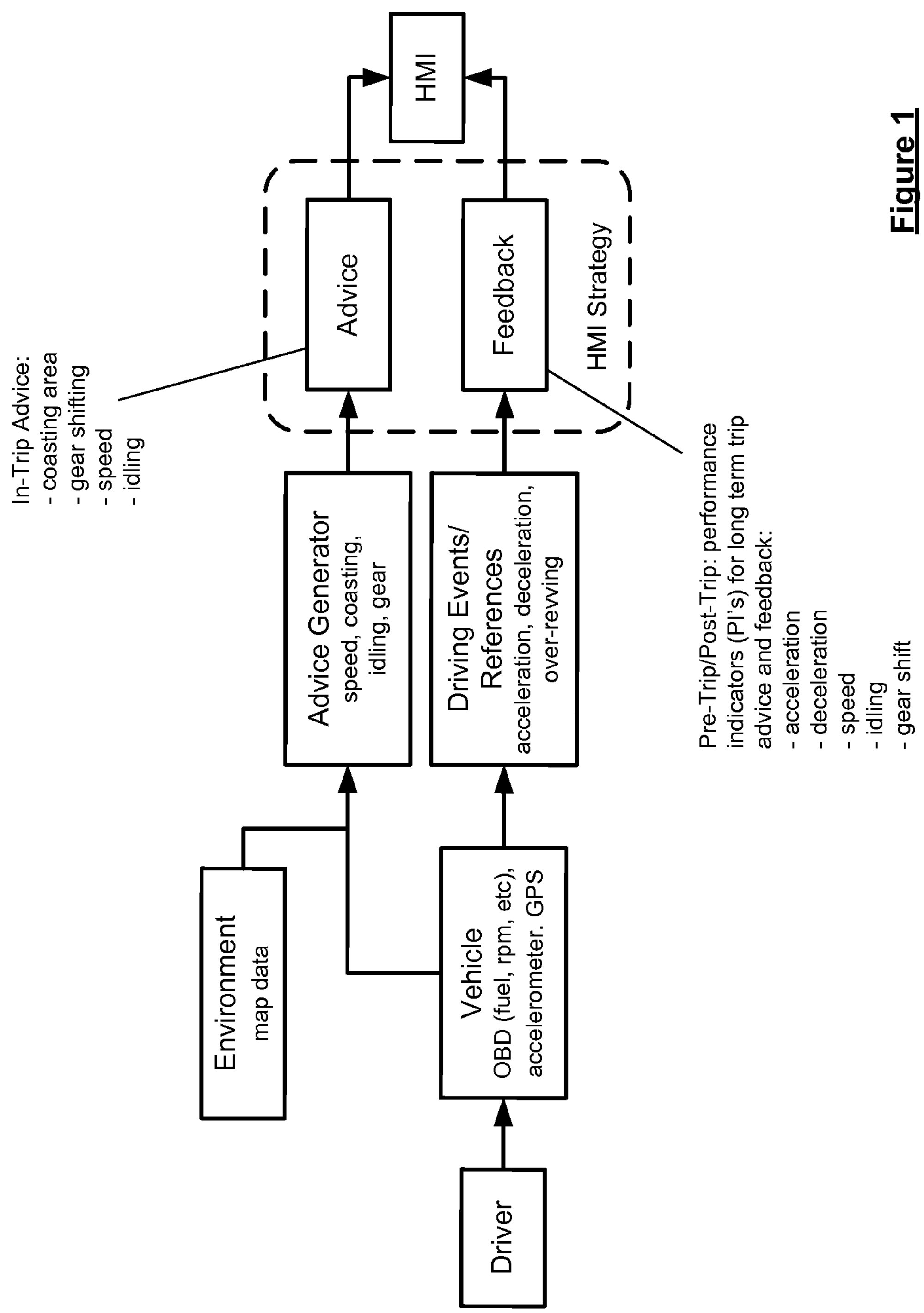
FIG. 1 is an illustration of a system for providing driver feedback.

An system for proving driver feedback is shown in FIG. 1. As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or “green” speed to achieve maximum economical results; times/areas when “coasting” is possible; gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager.

The invention is directed to the generation of a new performance indicator for use in providing driver feedback, and to methods for determining data for use in the generation of such a performance indicator. A summary of the each of the aspects of the invention is given below:

- The determination of whether a driver is coasting with braking or coasting without braking, based on the use of a vehicle’s fuel rate and engine speed to detect whether the vehicle is coasting, either ‘coasting in gear’ or ‘coasting in neutral’, together with a comparison between a measured current acceleration of the vehicle to a predetermined reference acceleration
- The determination of a coasting metric (or performance indicator) based on the amount of time spent coasting without braking during a trip in relation to the total amount of time that could have been spent coasting during the trip.

System Architecture

The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
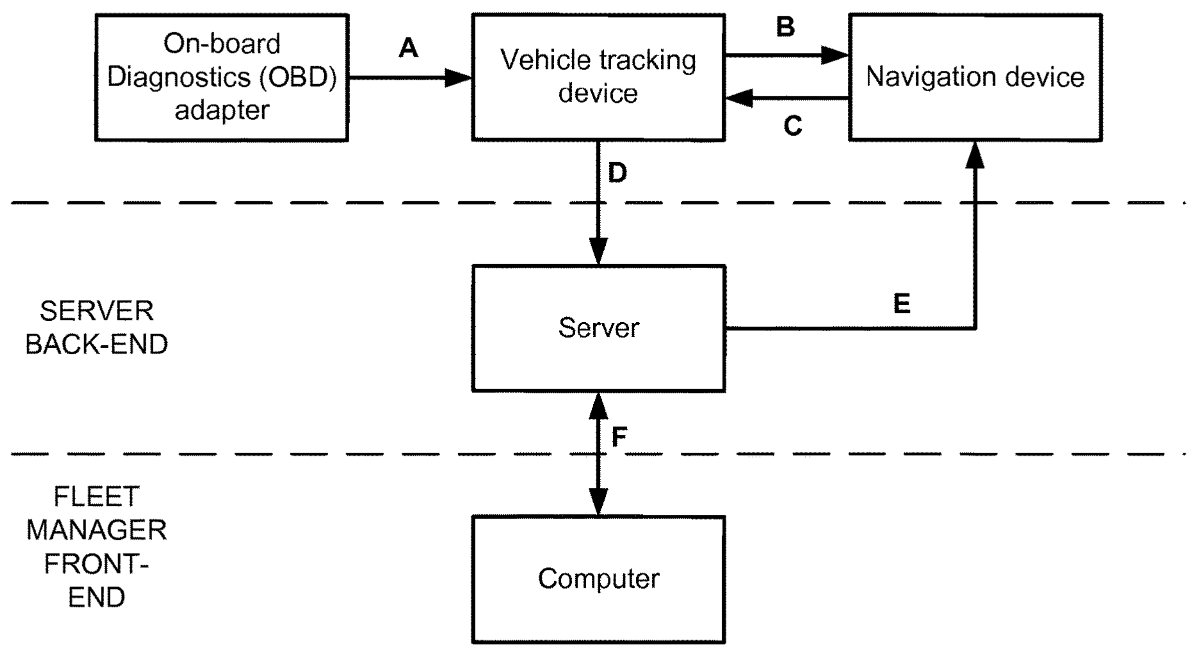
FIG. 2 is an illustration of a system according to an embodiment of the present invention.

The system of the invention is exemplified by FIG. 2 in which the vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD port provides the one or more parameters to the interface unit from a communication bus of the vehicle. It will be realised, however, that the interface unit may communicate with the vehicle via other connections such as a via a wireless connection. The adapter device is therefore preferably configured to collect data from the OBD port in the vehicle, such as engine speed (rpm), vehicle speed, and to determine other information derived from such OBD data, such as the current gear, maximum gear, fuel consumption, etc, and to deliver the data to the vehicle tracking device. In other words, the data transmitted, in a wired and/or wireless manner, to the vehicle tracking device is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators (as discussed in more detail below), e.g. a coasting performance indicator. For example, the tracking device further collects data to create the coasting histogram (as discussed below), which is needed at the server to calculate the coasting performance indicator.

Navigation Device:

The navigation device comprises at least one processor and a display device. The navigation device may be capable of one or more of: calculating a route to be travelled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip. The at least one processor can be further arranged to detect and calculate coasting zones, e.g. areas where coasting is possible, and to cause the calculated information to be displayed on the display device.

Server:

The server comprises at least one processor and a communications device for communicating with one of more of the vehicular devices, preferably the vehicle tracking device. The at least one processor is arranged to calculate at least one performance indicator, e.g. the coasting indicator, for a trip.

Computer:

The computer is in communication with the server, and is used by a fleet manager to review the performance of the drivers of their fleet of vehicles based on the determined performance indicators.

Coasting with/without Braking

According to embodiments of the invention, there is provided methods and systems for determining whether a driver of a vehicle is coasting during a trip. The term "coasting" in this instance means that the driver has lifted their foot off the accelerator (or gas pedal) to reduce the vehicle speed, such that the vehicle is allowed to naturally decelerate or to roll without being under power. In this way, a fuel economy of the vehicle may be improved. In the context of the invention, a coasting event can be "good", which means that the coasting is performed without braking simply rolling in neutral (i.e. without an inserted gear) or rolling with an inserted gear, or a coasting event can be "bad", which means that the coasting is performed with braking.

The detection of coasting is preferably based at least on fuel rate and engine speed, e.g. as obtained by the OBD adapter. Optionally, the detection of coasting is further based on the vehicle speed. For example, coasting may only be detected when the vehicle speed is above a predetermined threshold, such as 20 km/h.

In embodiments, the fuel rate when idling (the "idling rate") and the engine speed when idling (the "idling rpm") is determined for a vehicle, and these values are used to detect periods of coasting by the vehicle. The idling rate and idling rpm are preferably regularly updated at periods of standstill, e.g. each time the vehicle is stopped for a predetermined period of time with the engine running, such that the values reflect the current status of the vehicle. For example, the values may change over time based on the maintenance status of the vehicle.

Figure 4:
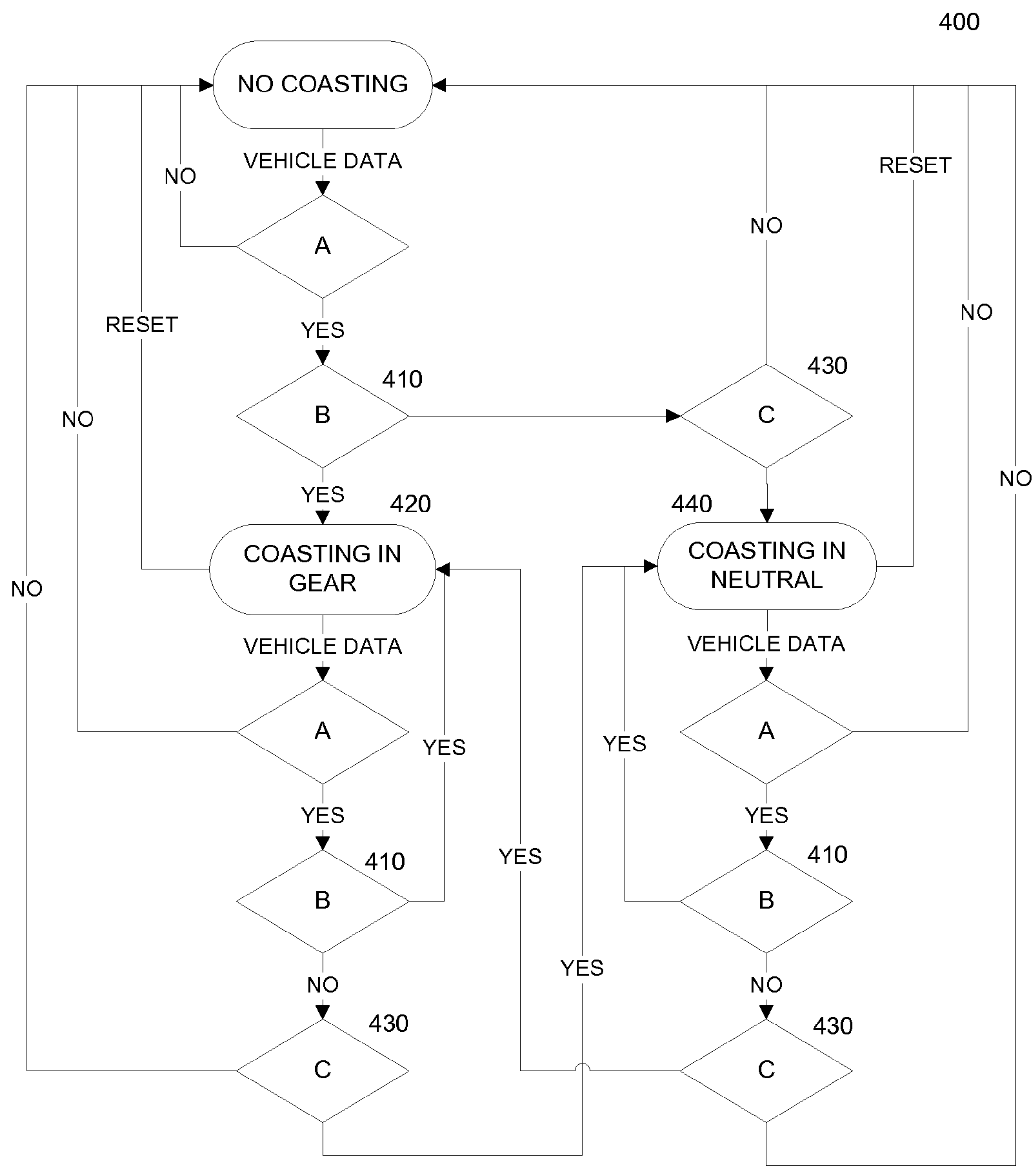
FIG. 4 shows a method for determining the coasting state of a vehicle according to an embodiment of the invention.

In embodiments, a determination is continuously made during a trip by a vehicle as to whether the vehicle is in one of the following states: "no coasting"; "coasting in gear"; or "coasting in neutral". An exemplary method for determining the state of the vehicle is shown in FIG. 4, and uses as inputs: the current speed of the vehicle; the current fuel rate of the vehicle; and the current engine speed of the vehicle. The threshold values $T_{S1}$, $T_{F1}$, $T_{F2}$ and $T_{E1}$ are all predetermined.

The thresholds $T_{F1}$ and $T_{F2}$ are each based on the determined idling rate for the vehicle; $T_{F1}$ typically be a less than the idling rate, while $T_{F2}$ is typically more the idling rate. Similarly, the threshold $T_{E1}$ is based on the determined idling rpm for the vehicle; $T_{E1}$ typically being more than the idling rpm. The method of FIG. 4 is based on the assumptions that the driver will not press the accelerator (or gas pedal) when coasting and that coasting can be performed with an inserted gear or when in neutral.

Figure 6:
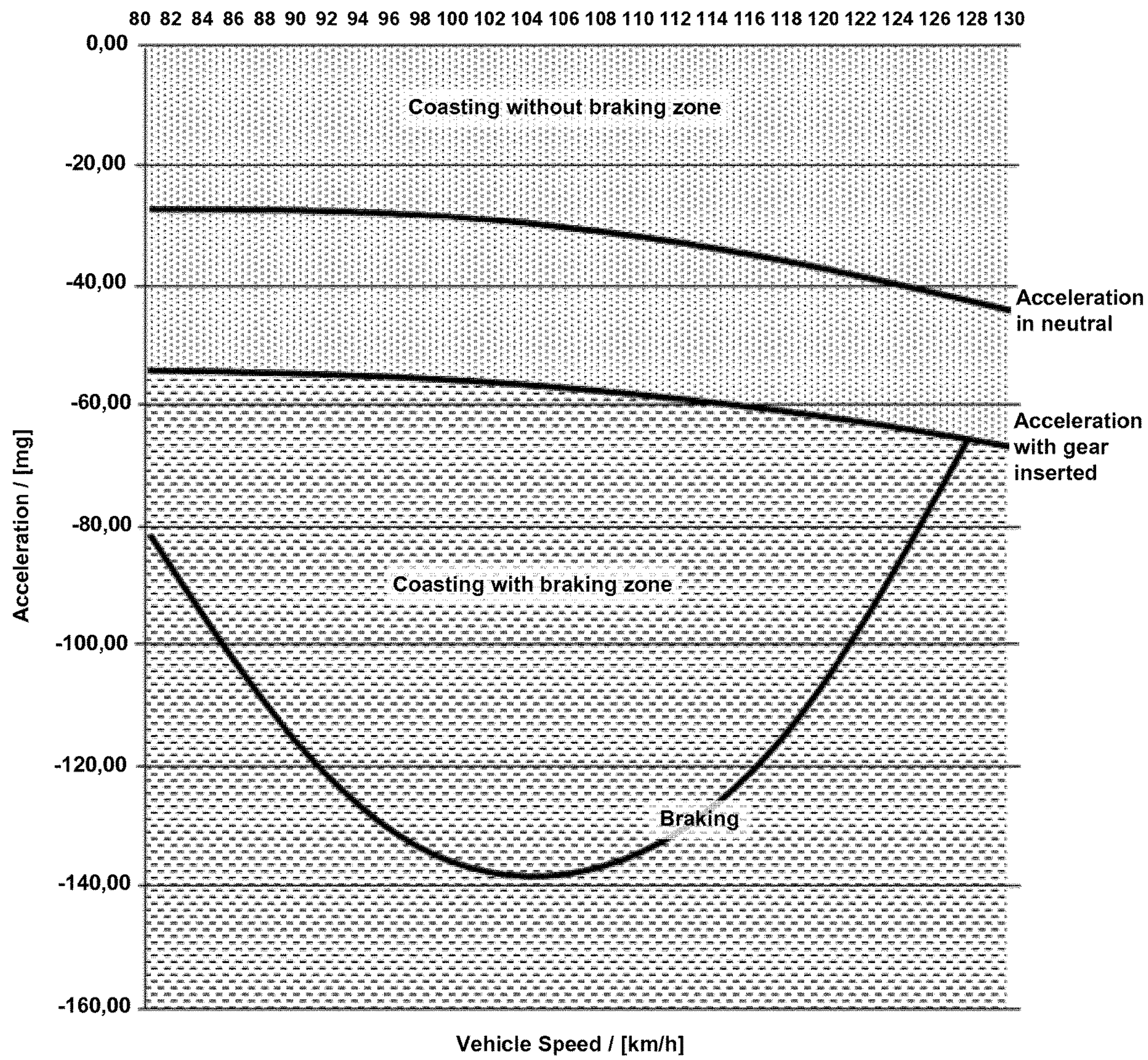
FIG. 6 shows an illustration of reference acceleration for various coasting states according to an embodiment of the invention.

In order to determine whether coasting is "good" (without braking) or "bad" (with braking), in embodiments, the current acceleration of the vehicle is measured, e.g. by looking at changes in vehicle speed, and compared to a reference acceleration. The reference acceleration is derived from acceleration threshold function, an example of which is shown in FIG. 6, and which provides a specific reference acceleration value for a current speed of a vehicle. The acceleration threshold function comprises an air resistance component (based, for example, on vehicle speed, air density, air drag coefficient, vehicle frontal area and vehicle mass—the frontal area and mass can be estimated based, for example, on the class of vehicle, or based on data input by a user); an engine resistance component (based, for example, on engine speed); a roll resistance component; and a component based on whether the vehicle is coasting in gear or in neutral. As will be appreciated, coasting is "good" when the measured acceleration of the vehicle is greater than the reference acceleration, and conversely coasting is "bad" when the measured acceleration is less than the reference acceleration.

In embodiments, the detection of coasting and evaluation of the type of coasting, e.g. using the methods as described above, is performed at one of the vehicle tracking device and the navigation device based on data received from the OBD adapter (and which is obtained from the OBD port of the vehicle).

Coasting Performance Indicator

The coasting performance indicator is based on the recognition that it is desirable to coast without braking, and ideally with the vehicle being in gear, for as much time as possible during a trip, since this reduces fuel consumption. Fuel consumption is reduced for two primary reasons. The first is that many engines cut off the fuel injection while coasting, as long as the engine speed is above the idling rpm. The second is caused by the duration of coasting; normally you would need longer to reduce speed through coasting than by braking. Therefore, the driver needs to stop maintaining a current speed (which consumes fuel) earlier if slowing through coasting than braking, which therefore leads to a reduction in fuel consumption.

The coasting performance indicator is calculated, e.g. at the server based on information received from the vehicle tracking device, based on the total driving time spent coasting without braking during a trip in relation to the total potential coasting time. A higher score is achieved the closer the total driving time spent coasting without braking is to the total potential coasting time. The total potential coasting time is the sum of the total time spent coasting without braking and the total time spent coasting with braking. The total potential coasting time is referred to herein as the 'deceleration' time and the total time spent coasting without braking is referred to herein as the 'coasting' time.

An exemplary report as viewable on the computer of the fleet manager showing the coasting performance metric for a plurality of trips made by a vehicle or driver is shown in FIG. 7. For example, in one journey on 1 October between 08h10 and 09h10, the driver coasted for 1 minute and 58 seconds, which equates to 58% of the total declaration time. The report also shows that this coasting time equates to a distance spent coasting of 2 km. The report also shows an overall score for the driver across all journeys of 4.9, wherein the driver has coasted for a total of 33 minutes, which equates to 59.3% of the total deceleration time across all journeys.

A further description of embodiments of the invention will now be described with reference to FIGS. 3 to 6.

Figure 3:
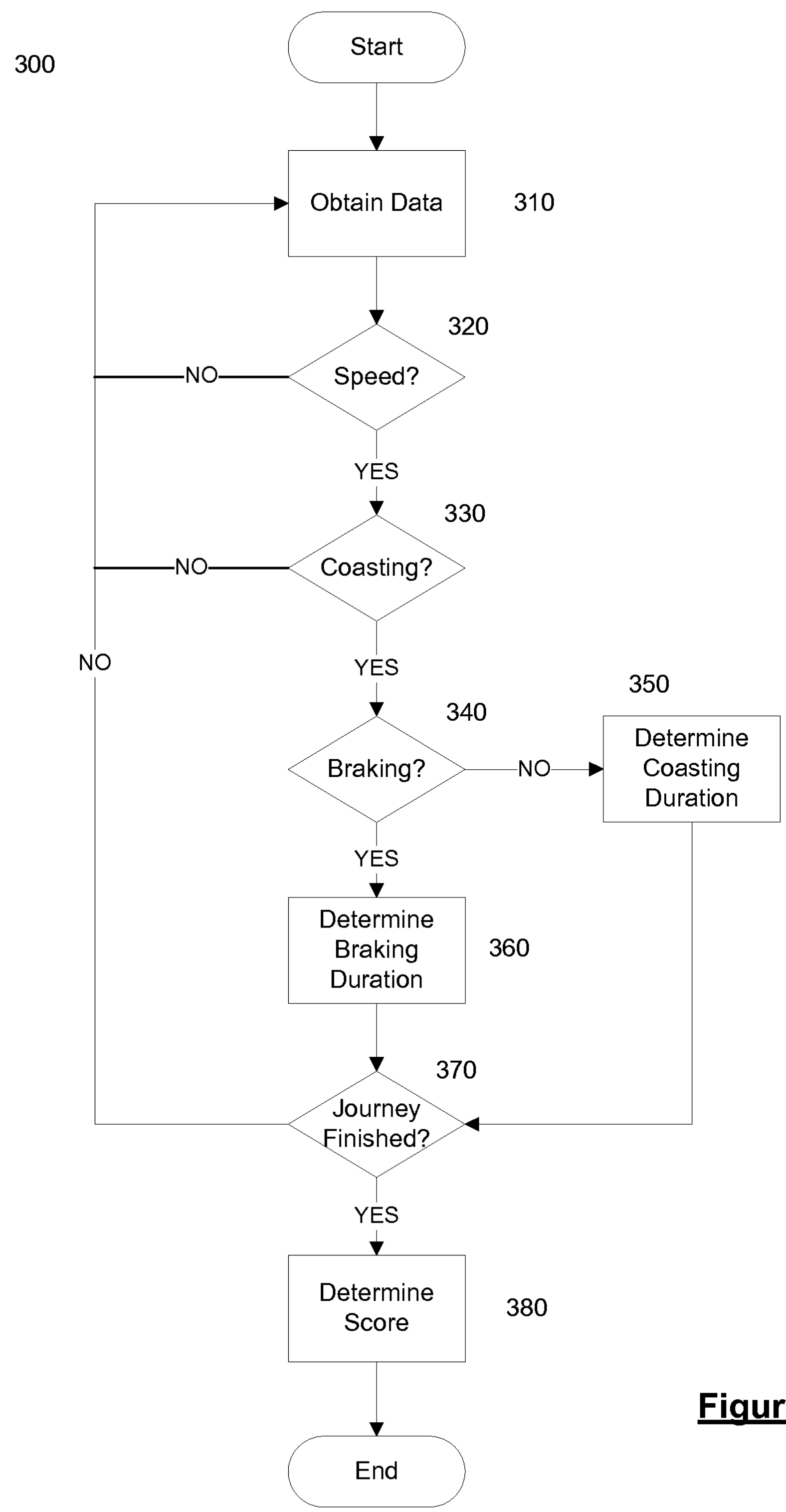
FIG. 3 shows a method of determining a coasting performance indicator (or metric) for a trip made by a vehicle according to an embodiment of the invention.

Referring to FIG. 3, a method 300 of determining a coasting state of a vehicle according to an embodiment of the invention is illustrated. The method 300 determines whether the vehicle is coasting in an in-gear state or in a neutral or "free rolling" state. As will be explained, the coasting state is determined based on one or more parameters of the vehicle.

Step 310 comprises receiving data indicative of the one or more parameters of the vehicle. The data indicative of the one or more parameters may be received via the OBD port of the vehicle. The parameters may comprise a fuel consumption rate of the vehicle, in particular the drive-unit (or engine) of the vehicle, and a speed of the engine of the vehicle (e.g. determined in revolutions per minute (rpm)).

The fuel consumption rate of the vehicle may be obtained directly from the vehicle, e.g. from the CAN bus. In preferred embodiments, however, the fuel consumption rate is estimated from data obtained via the OBD port of the vehicle. An exemplary method for estimating the fuel consumption rate of a vehicle using data obtained from the OBD port of a vehicle is described in WO 2012/137016 A2 entitled "Method and Apparatus for estimating the fuel consumption of a vehicle"; the contents of which is incorporated herein by reference.

In some embodiments of step 310 a speed of the vehicle is determined. Data indicative of the speed of the vehicle 105 may be obtained from the OBD port of the vehicle. Alternatively the speed of the vehicle may be obtained using received wireless signals, such as from a GNSS receiver.

In step 320, in some embodiments, it is determined whether the speed of the vehicle is greater than a predetermined speed $T_{S1}$. The predetermined speed may be, for example, 10 $kmh^{-1}$ or 20 $kmh^{-1}$, although it will be realised that other speeds may be chosen. If the speed of the vehicle is not greater than the predetermined speed, for example the vehicle is stationary or moving slowly, then the method 300 returns to step 310. If, however, the speed of the vehicle is greater than the predetermined speed then the method 300 progresses to step 330. Step 320 aides determination of the coasting state by improving a likelihood that the fuel consumption rate of the engine may be used to determine the coasting state.

In step 330 it is determined whether the vehicle is coasting. It will be understood that the term coasting is intended to mean "freewheeling" or not being under positive acceleration provided by a motive force generator, such as the engine of the vehicle. It will be understood that whilst in the coasting state the vehicle is generally expected to decelerate, although the vehicle may accelerate if present on a negative gradient. If it is determined in step 330 that the vehicle is not coasting then the method returns to step 310. In embodiments of step 330 a coasting state of the vehicle is also determined. The coasting state may mean one of "coasting in gear" or "coasting in neutral". Coasting in gear (CiG) is intended to mean that the motive force generator is mechanically coupled to one or more of the vehicle's wheels such that the motion of the vehicle is operative to cause movement of the motive force generator. For example, rotation of the vehicle's wheels causes the engine to turn-over. In some cases, such as although not necessarily, where the vehicle is present upon a negative gradient, the engine may apply force to resist acceleration of the vehicle or cause deceleration of the vehicle due to engine-braking. Coasting in neutral (CiN) is intended to mean that the motive generator or engine of the vehicle is substantially decoupled from movement of the vehicle. For example a clutch may be opened to cause rotation of the vehicle's wheels not to be substantially communicated to the engine. In this case the vehicle is able to freewheel and may accelerate generally unrestrained on a negative gradient or may decelerate less than when CiG. A method 400 of determining the coasting state of the vehicle will be explained with reference to FIG. 4.

If the vehicle is not coasting, i.e. force is being applied by the engine to either maintain the speed of the vehicle or to accelerate the vehicle, then the method returns to step 310, as noted above. The vehicle is thus determined to be in a no coasting state. If, however, the vehicle is coasting then the method moves to step 340.

In step 340 it is determined whether a braking force is applied to the vehicle in the coasting state. That is, whether one or more brakes of the vehicle are applied to cause deceleration of the vehicle. The brakes may be mechanical brakes, such as where braking pads are applied to contact a disc associated with one or more of the wheels of the vehicle, or other braking force such as the engagement of an electric generator such as for recharging a battery of the vehicle.

If no braking is applied then the method moves to step 350 where a coasting duration is determined. The coasting duration may be determined by incrementing a counter by a predetermined increment. In one embodiment steps 310 to 340 may be performed at a predetermined interval such as every second, although it will be realised that other intervals may be used. In this case the coasting duration counter is incremented by the interval. The coasting duration may alternatively be determined by starting and stopping an associated timer.

If it is determined in step 340 that braking is applied to the vehicle whilst coasting then the method moves to step 360. A method 500 of determining whether braking is applied to the vehicle will be described below with reference to FIG. 5. In step 360 a braking duration is determined. The braking duration may be determined by incrementing a counter by a predetermined increment. As noted above, where steps 310 to 340 are performed at a predetermined interval, such as every second, the braking duration counter is incremented by the interval. The braking duration may alternatively be determined by starting and stopping an associated timer.

In step 370 it is determined whether a journey of the vehicle is finished. The determination of the journey being finished may be made based on an occurrence of a predetermined event. The predetermined event may be, for example, the vehicle being stationary more than a predetermined period of time, an electrical system of the vehicle being powered down or an indication of a control system of the vehicle being switched off responsive to a user input or control. It will be realised that other events may be used. Whilst in embodiments of the invention a value indicative of an application of braking whilst coasting is determined following completion of a journey by the vehicle, it will be realised that in other embodiments the value may be determined during the journey such as on an on-going basis in other embodiments.

In step 380 a score indicative of the degree of coasting by the user during a journey is determined, e.g. by determining the ratio of the time spent coasting without braking, i.e. the time of step 350, to the sum of the time pent coasting both with and without braking, i.e. the sum of the times of steps 350 and 380. The score may, in some embodiments, be determined by another computing device, such as server, following communication of data from the apparatus. As will be appreciated the times determined in steps 350 and 380 can be used in any manner as desired to determine a suitable score.

The method 400 of determining the coasting of the vehicle will now be explained with reference to FIG. 4.

In step 410 the fuel consumption rate determined in step 310 is compared against a predetermined minimum fuel consumption rate $T_{F1}$. The minimum fuel consumption rate $T_{F1}$ may be less than an idling fuel consumption rate of the vehicle. If the fuel consumption rate of the vehicle is less than the minimum fuel consumption rate then the method moves to step 420 where it is determined that the coasting state of the vehicle 105 is CiG.

If the fuel consumption rate is determined in step 410 to be more than the minimum fuel consumption rate $T_{F1}$ then the method moves to step 430.

In step 430 it is determined whether the fuel consumption rate and/or engine speed of the vehicle 105 meets one or more predetermined criteria. In particular in one embodiment of step 430 it is determined whether the fuel consumption rate is within predetermined limits or a predetermined fuel consumption band. The limits comprise a lower fuel consumption rate and an upper fuel consumption rate $T_{F2}$. The lower fuel consumption rate is less than a fuel consumption rate of the vehicle in an idle state where the engine is running but the vehicle not moving, and may be equal to 0. The upper fuel consumption rate may be based upon the fuel consumption rate of the vehicle in the idle state. A predetermined margin may be applied to the fuel consumption rate of the vehicle in the idle state to reduce a likelihood of incorrect decisions. The fuel consumption in the idle state may be determined by the apparatus based upon the speed information being indicative of the vehicle being stationary and data indicative of the fuel consumption rate whilst stationary, e.g. as received from a device coupled to the OBD port of the vehicle. The fuel consumption rate in the idle state may be updated periodically, in some embodiments, in order to account for variability, such as due to temperature under control of a the fuel management system of the vehicle. The margin may be an additional percentage such as 25 or 50%.

In step 430 it may also be determined whether the engine speed is within predetermined limits or a predetermined engine speed band. The limits comprise a lower engine speed and an upper engine speed. The lower engine speed may be equal to 0 and the upper engine speed $T_{E1}$ may be based upon an engine speed of the vehicle in the idle state where the engine is running but the vehicle not moving. A predetermined margin may be applied to the engine speed of the vehicle in the idle state to reduce a likelihood of incorrect decisions. The engine speed in the idle state may be determined based upon the speed information being indicative of the vehicle being stationary and data indicative of the engine speed whilst stationary. The engine speed in the idle state may be updated periodically, in some embodiments, in order to account for variability, such as due to temperature under control of a the fuel management system of the vehicle. The margin may be an additional percentage such as 5, 10 or 15%.

If one or both of the above-mentioned conditions are not satisfied, then the method returns to step 410. On the other hand, if both conditions are satisfied then the method moves to step 440 where it is determined that the coasting state is CiN.

Figure 5:
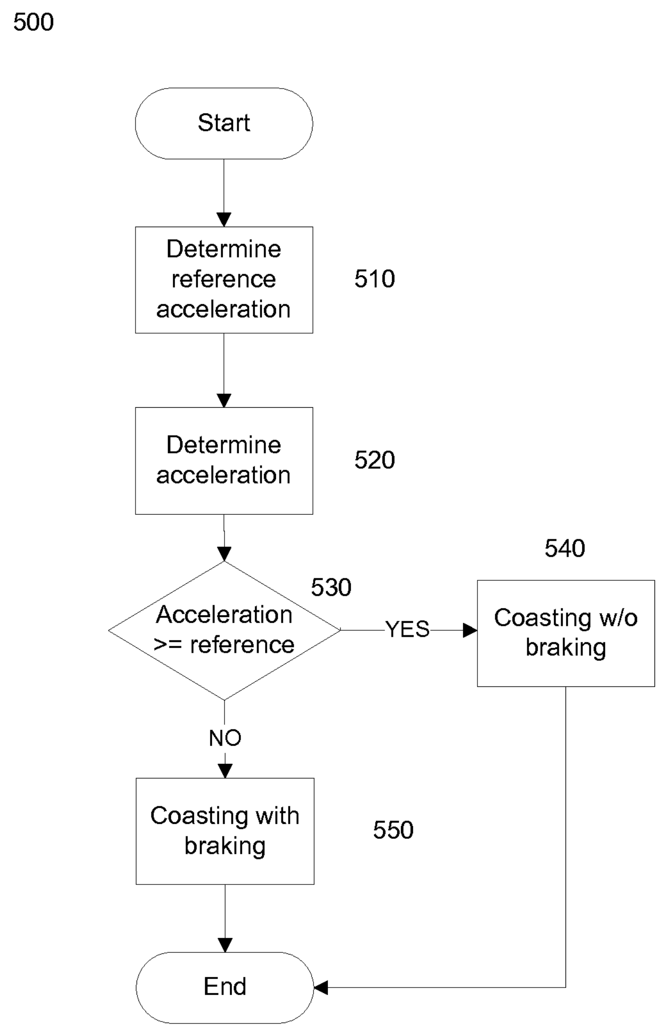
FIG. 5 shows a method of determining whether a vehicle is coasting with or without braking according to an embodiment of the invention.

FIG. 5 illustrates a method 500 of determining whether braking is applied to the vehicle according to an embodiment of the invention.

In step 510 a reference acceleration is determined for the coasting state of the vehicle. The reference acceleration is determined with reference to data associated with the vehicle. In some embodiments at least some of the data is obtained from the OBD port (or similar interface unit) of the vehicle. The data may comprise an indication of the type of vehicle and a current speed of the vehicle. As noted above, the speed of the vehicle may be obtained via the OBD port or may be determined by the navigation device or vehicle tracking device. The type of vehicle may be stored in a memory of the apparatus. The indication of the type of the vehicle may have been previously stored in the apparatus such as at a time of initialisation or received from a user of the vehicle, such as via an interface of the navigation device. The indication of the type of the vehicle may be one of car, motorcycle, light commercial or heavy commercial, although it will be realised that these are merely exemplary. The indication of the vehicle type is used to determine an approximation of one or more parameters of the vehicle for determining the reference acceleration. The parameters may comprise one or more of a drag coefficient, frontal area of the vehicle and mass of the vehicle.

FIG. 6 illustrates acceleration for a vehicle having particular parameters over a range of vehicle speeds for CiG and CiN. Also illustrated is acceleration due to positive braking, i.e. that intended by the driver, for example in order to avoid an obstruction. As can be appreciated, greater negative acceleration (deceleration) is experienced when the vehicle is in neutral (CiN) than when the vehicle is in gear (CiG).

Thus it can be appreciated that in step 510 the reference acceleration for the vehicle speed is determined according to the coasting state of the vehicle. The determination may be retrieving the reference acceleration from a data structure stored in memory of the apparatus or the above described calculations may be performed in each iteration of step 510.

In step 520 an acceleration of the vehicle is determined. The acceleration of the vehicle may be determined from a plurality of speed determinations of the vehicle and an interval of time between the determinations. Whilst the acceleration may be determined from two speeds of the vehicle and a duration there-between in some embodiments more than two speed determinations may be used, such as an average of three or more than three speed determinations over a duration of time, such as three seconds or more than three seconds. In this way an improved average acceleration of the vehicle is determined over the duration of time.

In step 530 it is determined whether the acceleration provided from step 520 is greater than or equal to the reference acceleration. If the determined acceleration is greater than or equal to the reference acceleration then the method moves to step 540 where it is determined that the vehicle is coasting without the application of braking, i.e. "good coasting". If, however, the determined acceleration is less than reference acceleration then the method moves to step 550 where it is determined that the vehicle is coasting with the application of braking, i.e. "bad coasting". Steps 540 and 550 correspond to steps 350 and 360, respectively, in FIG. 3.

Steps 310 to 370 of the method 300 shown in FIG. 3 may be performed by a computing device within the vehicle, such as a processor of the navigation unit or vehicle tracking unit. As noted, the methods are performed based on data received from the vehicle via the OBD port or other similar vehicle connection.

Following step 370 data indicative of the one or more counters determined by steps 310 to 370 is communicated to the server. The server, or another computing device, is arranged to determine the score in step 380. The score and/or representations of the data provided by a computing device may be provided to a user of the server or the another computing device.

Any of the methods in accordance with the invention as described above may be implemented at least partially using software, e.g. computer programs. The present invention thus also extends to a computer program comprising computer readable instructions executable to perform, or to cause a computing device, e.g. OBD adapter, vehicle tracking device, navigation device, server, etc, to perform, a method according to any of the above described aspects or embodiments of the invention. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

The invention claimed is:

1. A method of evaluating the driving of a vehicle performing a journey on a road network, comprising:

determining a fuel usage rate and an engine speed of a vehicle;

determining when the vehicle is coasting based upon at least one of the fuel usage rate and the engine speed of the vehicle;

comparing an acceleration of the vehicle, when the vehicle is determined to be coasting, with a predetermined reference acceleration;

determining an application of braking during the coasting based on a result of the comparing; and displaying, in a display device, as an indication of a driver's driving performance while coasting, a representation of a score indicative of a proportion of coasting during the journey for which the vehicle is coasting without braking, the score being determined based on the application of braking, and/or transmitting data about the application of braking to a remote device for use thereby in characterizing the driver's driving performance while coasting.

2. The method of claim 1, wherein the determining of the application of braking during the coasting comprises determining that the vehicle is coasting with braking when the acceleration of the vehicle is less than the predetermined reference acceleration.

3. The method of claim 2, comprising determining a first time indicative of the duration of time for which the vehicle is coasting with braking during the journey.

4. The method of claim 3, comprising at least one of: displaying a representation of the first time on a display device, optionally within the vehicle; and transmitting the first time to a remote device.

5. The method of claim 1, wherein the determining of the application of braking during the coasting comprises determining that the vehicle is coasting without braking when the acceleration of the vehicle is greater than or equal to the reference acceleration.

6. The method of claim 5, comprising determining a second time indicative of the duration of time for which the vehicle is coasting without braking during the journey.

7. The method of claim 6, comprising at least one of: displaying a representation of the second time on a display device, optionally within the vehicle; and transmitting the first time to a remote device.

8. The method of claim 6, comprising:

determining a first time indicative of the duration of time for which the vehicle is coasting with braking during the journey; and determining the score indicative of the proportion of coasting during the journey for which the vehicle is coasting without braking based on the first and second times.

9. The method of claim 1, comprising determining a coasting state of the vehicle based upon at least one of the fuel usage rate and the engine speed of the vehicle, and selecting the predetermined reference acceleration based on the determined coasting state.

10. The method of claim 9, wherein the coasting state is one of: coasting in gear; and coasting in neutral.

11. The method of claim 9, wherein the coasting state is determined based upon a comparison between the fuel usage rate and at least one predetermined threshold.

12. The method of claim 11, wherein the coasting state is determined to be coasting in gear when the fuel usage rate is less than an idle fuel usage rate.

13. The method of claim 11, wherein the coasting state is determined to be coasting in neutral when the fuel usage rate is less than a predetermined threshold based upon an idle fuel usage rate.

14. The method of claim 11, wherein the coasting state is determined to be coasting in neutral based upon the fuel usage rate and when the engine speed is less than a predetermined threshold based upon an idle engine speed.

15. The method of claim 1, wherein the predetermined reference acceleration is determined based upon an air resistance component and an engine resistance component.

16. The method of claim 15, wherein the air resistance component is based upon one or more of: vehicle speed; air density; air drag coefficient; vehicle frontal area; and vehicle mass.

17. The method of claim 15, wherein the engine resistance component is based upon the engine speed.

18. A non-transitory computer readable medium comprising instructions which, when executed by at least one processor of an apparatus comprising at least one processor, cause the apparatus to operate according to the method of claim 1.

19. An apparatus for evaluating the driving of a vehicle performing a journey on a road network, comprising at least one processor and a memory containing instructions that, when executed by the at least one processor, cause the apparatus to:

determine a fuel usage rate and an engine speed of a vehicle;

determine when the vehicle is coasting based upon at least one of the fuel usage rate and the engine speed of the vehicle;

compare an acceleration of the vehicle, when the vehicle is determined to be coasting, with a predetermined reference acceleration;

determine an application of braking during the coasting based on the result of the comparison; and wirelessly transmit data indicative of the application of braking in the coasting state to a remote computing device to be used for characterizing the driver's driving performance while coasting.

20. A system, comprising:

an apparatus according to claim 19; and a remote computing device arranged to receive the data indicative of the application of braking in the coasting state from the apparatus and use the data indicative of the application of braking for characterizing the driver's driving performance while coasting.

* * * * *